Feb. 21, 1933.                P. SCHLUMBOHM                1,898,791
                                 MIRROR
                            Filed Feb. 25, 1930
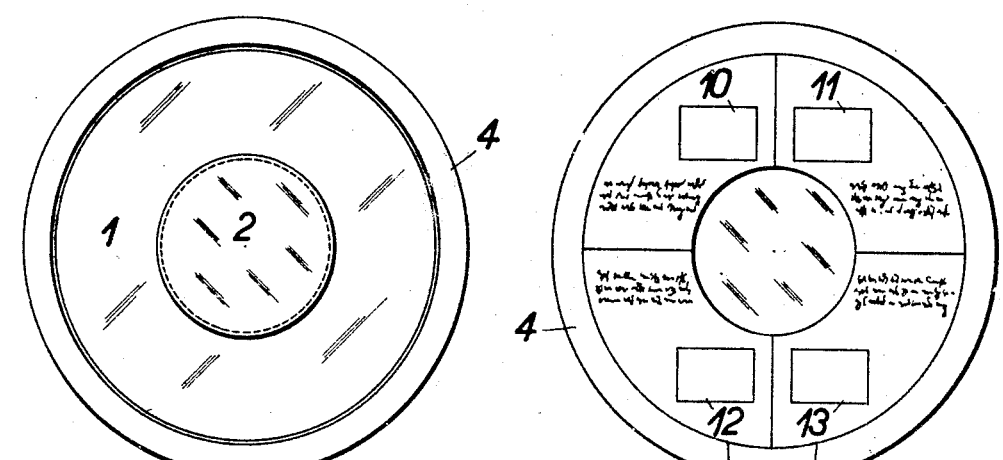
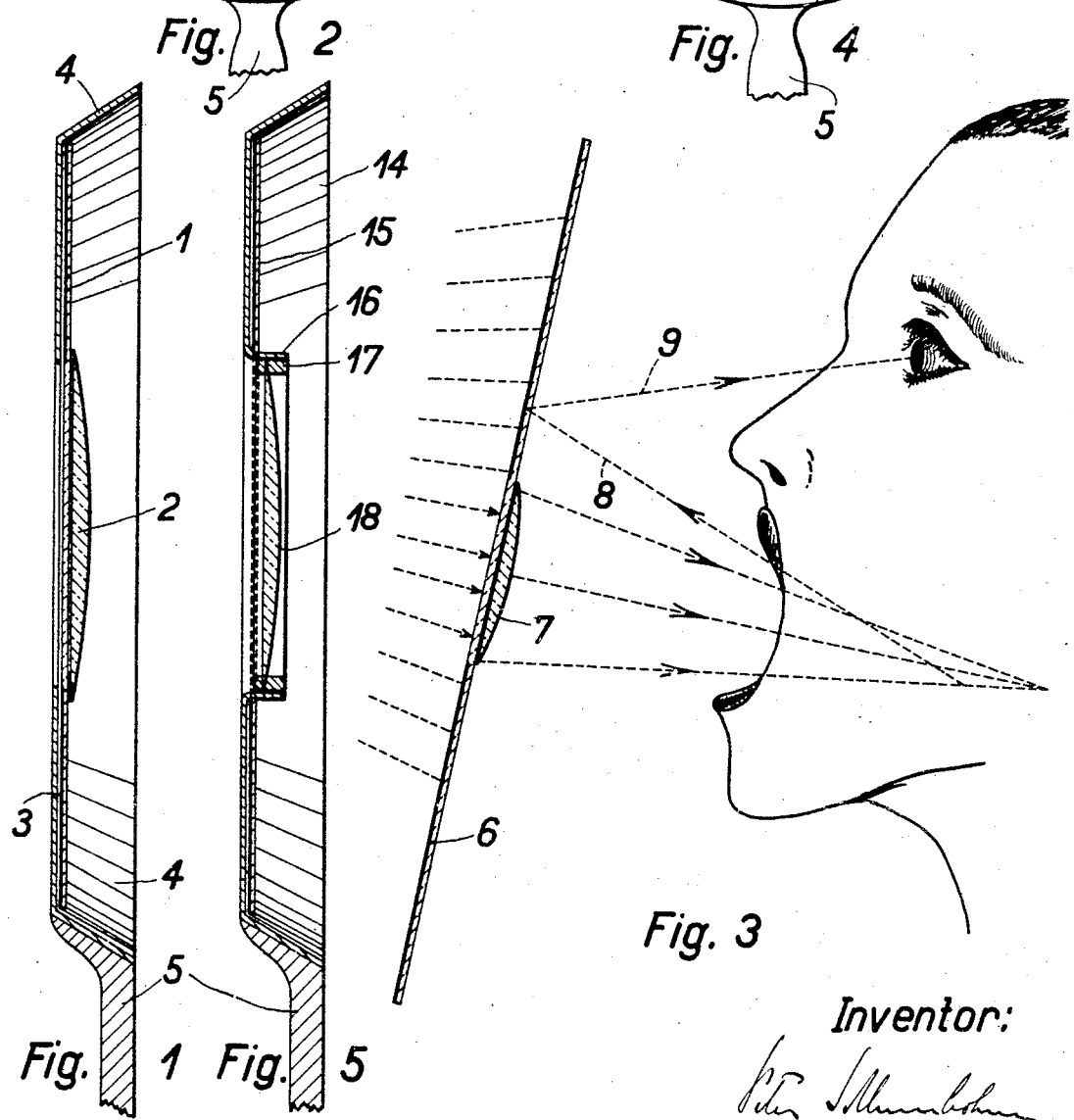
Inventor:

Patented Feb. 21, 1933

1,898,791

UNITED STATES PATENT OFFICE

PETER SCHLUMBOHM, OF BERLIN, GERMANY, ASSIGNOR TO THE AMERICAN THERMOS BOTTLE COMPANY, OF NORWICH, CONNECTICUT, A CORPORATION OF OHIO

MIRROR

Application filed February 25, 1930, Serial No. 431,141, and in Germany March 2, 1929.

The present invention pertains to a mirror which offers the advantage of being easily handled by any person who wants to examine parts of his head, e. g. the cavity of his throat, an affected part of his face, or the like. The new mirror is provided with an opening serving the purpose of allowing the light emanating from a special source of light arranged behind the mirror to fall on the place to be examined. When holding the mirror in the proper way the user sees in it the illuminated part and, at the same time, the mirror prevents him from being dazzled by the rays coming direct from the source of light. When, especially in the case of artificial sources of light, a more intense illumination is desired, the rays coming from the source of light are gathered approximately at the spot to be illuminated by providing the mirror with a converging lens which may be made of the same piece as the mirror (and need not necessarily be placed in an opening in the mirror).

Compared with a device in which a source of light is attached to the mirror itself, the one under consideration offers the advantage of being manufactured at low cost and of having a light weight which makes its application an easy one. Another advantage consists therein that the device can be used independently of a source of electric current. Therefore, when applying it, the user can dispense with a wall-plug and does not run the risk of damaging the incandescent lamp by shocks. Finally, a lens cannot make the rays gather at the spot to be examined when the source of light has a fixed position, for in this case the source of light must necessarily be outside the focal width of the lens. For this reason the source of light would have to be attached to the device at such a distance as would render the device unwieldly. With the new device, however, a lens of a somewhat greater focal width (lying between approximately 10 and 30 cm.) can be used and either day-light or any existent artificial source of light, for instance a table lamp situated at a corresponding distance, may be taken.

The mirror may be plane or concave. Also a double-sided mirror may be applied, viz. a mirror which is plane on one side and concave on the other. In order to improve the protection against light and, at the same time, to protect the mirror and eventually also the lens from being injured, the mirror is conveniently surrounded by a protruding margin which appropriately takes the form of the convex surface of the frustrum of a cone. When making the lens of quartz or of a suitable glass, the device allows of being used for intense radiation with ultra-violet light, and the patient himself can control whether the right or the wrong places are radiated; consequently the inconvenience of the patient always keeping a certain position is avoided.

As the mirror can be used in a simple way by any person who wants to examine the cavity of his own mouth, it is suitably provided with illustrations that permit the said person to judge the image he sees by showing, for instance, a healthy and an affected throat or by representing phonetic instruction pictures of the cavity of the mouth.

The accompanying drawing explains the invention in several executional examples. Figure 1 shows a mirror in a perpendicular section. Figure 2 shows on a reduced scale the same mirror viewed from in front. Figure 3 explains schematically how the mirror is applied for examining the cavity of the user's mouth. Figure 4 is a back view on a reduced scale of the mirror according to Figure 2. Figure 5 represents in a perpendicular section another executional example.

The example according to Figures 1, 2, and 4 shows a plane mirror 1 with a lens 2 centrally attached to it. Where the lens is provided, the mirror covering 3 is interrupted. The mirror is surrounded by a shade 4 and has a handle 5. The lens is, e. g., cemented on, but (in case of a glass mirror) it may be made of one piece with the mirror. The back of the mirror (Figure 4) is provided with four illustrations, 10 to 13, and respective explanations.

In the example represented by Figure 5 an annular mirror 15 is surrounded by a shade 14. Part of the shade 14 takes the form of a ring 16, which goes through the opening in the mirror. By means of a frame 17 this ring is made to hold an interchangeable lens 18.

The mode of using the new device is illustrated by Figure 2. The light rays divergingly projected by a source of light strike the lens 7 and are gathered in the cavity of the user's mouth. The rays coming from the illuminated part are directed by means of the mirror 6 along 8—9 to the user's eye, and the mirror protects the user from the rays coming direct from the source of light. When applying the mirror according to Figure 5 and removing the lens from the mirror, the rays freely pass through the opening, and a not intensified illumination or radiation is obtained.

I claim:

1. A hand mirror mechanically disconnected from any source of light and provided substantially at the center with a lens for converging light rays coming from a suitable source behind the mirror, which is freely movable with respect to the light so that the latter is brought outside the focus of the lens to produce convergent light, said central lens being surrounded by an unobstructed mirror surface of requisite width.

2. A hand mirror mechanically disconnected from any source of light and provided substantially at the center with a lens for converging light rays coming from a suitable source behind the mirror, which is freely movable with respect to the light so that the latter is brought outside the focus of the lens to produce convergent light, and a marginal flange projecting from said mirror to shade the eyes of the user from the source of light, said central lens being surrounded by an unobstructed mirror surface of requisite width.

3. A hand mirror mechanically disconnected from any source of light and provided at the center with an opening surrounded by a ring, and a lens removably mounted in said ring for converging light rays coming from a suitable source behind the mirror, said central lens leaving an annular unobstructed mirror surface of substantially uniform width all around.

4. A hand mirror mechanically disconnected from any source of light comprising a circular frame which has a central opening surrounded by an annular flange, a mirror mounted on said frame and surrounding said flange, a lens mounted in said flange for converging light rays coming from a source behind the mirror, and a forwardly projecting rim on said frame for shading the eyes of the user from said source of light.

5. A hand mirror mechanically disconnected from any source of light comprising a circular frame which has a central opening surrounded by an annular flange, a mirror mounted on said frame and surrounding said flange, a lens removably mounted in said flange for converging light rays coming from a source behind the mirror, and a forwardly projecting conical rim on said frame for shading the eyes of the user from said source of light, said flange and rim being integral with said frame.

6. A hand mirror mechanically disconnected from any source of light and provided with a lens for converging light rays coming from a suitable source behind the mirror, which is freely movable with respect to the light so that the latter is brought outside the focus of the lens to produce convergent light, a marginal flange projecting from said mirror to shade the eyes of the user from the source of light, and a handle forming an integral extension of said flange.

7. A hand mirror comprising a plate, a lens carried by said plate for concentrating light from behind the mirror on an object in front of the mirror, a mirror element surrounding said lens, and an opaque rim extending forwardly from the plate to shade the mirror and to shield the eyes of the user from the light behind the mirror.

8. A hand mirror comprising a plate, a lens carried by said plate for concentrating light from behind the mirror on an object in front of the mirror, a mirror element surrounding said lens, and an outwardly flared opaque rim extending forwardly from the plate to shade the mirror and to shield the eyes of the user from the light behind the mirror.

PETER SCHLUMBOHM.